United States Patent [19]

de Leeuw et al.

[11] 4,344,998
[45] Aug. 17, 1982

[54] METALLIZED COMPOSITE STRUCTURE AND A METHOD OF PREPARING SAME

[75] Inventors: Johannes A. N. de Leeuw, Apeldoorn; Johannes T. Brugmans, Enkhuizen, both of Netherlands

[73] Assignee: Koninklijke Emballage Industrie Van Leer, Amstelveen, Netherlands

[21] Appl. No.: 137,945

[22] Filed: Apr. 7, 1980

[30] Foreign Application Priority Data

Feb. 15, 1980 [NL] Netherlands .......................... 8000967

[51] Int. Cl.³ .......................... B32B 7/12; B32B 15/04
[52] U.S. Cl. .................................. 428/212; 156/230; 156/247; 156/289; 427/146; 428/195; 428/198; 428/211; 428/213; 428/215; 428/220; 428/285; 428/344; 428/354; 428/457; 428/463
[58] Field of Search ........................ 156/230, 247, 289; 427/146; 428/344, 354, 457, 914, 421, 483, 463, 518, 285, 212, 213, 215, 195, 198, 211

[56] References Cited

U.S. PATENT DOCUMENTS 3,235,395 2/1966 Scharf .................................. 428/914
3,949,139 4/1976 Dunning et al. ..................... 428/914

Primary Examiner—James J. Bell
Attorney, Agent, or Firm—Lawrence Rosen

[57] ABSTRACT

A metallic laminate is prepared by coating a major surface of a polymeric film with a release agent having the capacity to effect a weak releasable bond from the surface of the polymeric film and a strong non-releasable bond with a surface of a stratum of metal which has been freshly vapor deposited, precipitating a thin coherent stratum of metal on the coated surface of the polymeric film by vapor deposition, applying a layer of standard laminating adhesive to the exposed stratum of metal and bonding the stratum of metal to a non-metallic substrate by standard laminating techniques using a liquid lacquer that, after application on the carrier, has a contact angle of 0° to the carrier surface. The resulting metallized vapor coated composite structure has a reflectivity of at least 85%, a heat emission of about 8% of the Stefan Boltzmann constant at 25° C., a mirror reflectivity of at least 4, and dead fold properties that are the same as those of the substrate.

10 Claims, 5 Drawing Figures

METALLIZED COMPOSITE STRUCTURE AND A METHOD OF PREPARING SAME

The present invention relates to a metallised vapour coated composite structure having a reflectivity of at least 85%, a heat emission of about 8% of the Stefan Boltzmann constant at 23° C., a mirror reflectivity, as defined herebelow, of at least 4 and dead fold properties that are the same as those of the substrate. Said composite structure can also be made to have a low water vapour transmission rate and low gas permeation rates. Said composite structure comprises a coherent continuous outer lacquer upon which a coherent, continuous stratum of metal having a thickness of between 0.01 and 0.1 microns has been vapour deposited, a layer of a laminating adhesive in coextensive union with the free major surface of the vapour deposited metal stratum, and a substrate bonded to the metal stratum by means of the laminating adhesive.

A process for preparing metallic laminates, wherein (a) a major surface of a polymeric film is coated with a release agent having the capacity to effect a weak, releasable bond from the surface of the polymeric film and a strong, non-releasable bond with the surface of a stratum of metal which has been freshly vapour deposited, (b) a thin, coherent stratum of metal is precipitated upon the coated surface of the polymeric film by vapour deposition (c) a layer of a standard laminating adhesive is applied to the exposed stratum of metal and bonding said stratum of metal to a non-metallic substrate by standard laminating techniques, and finally said polymeric film is stripped from said composite structure, is disclosed already in U.S. Pat. No. 3,235,395.

Though metallic vapour coated laminates of that type have very attractive properties, they do not meet important requirements with respect to e.g., folding properties, mirror reflection, uniformity, printability, low water vapour transmission rate and heat sealability.

It was found now that in order to meet all or only part of said requirements it was necessary to use a liquid lacquer that, after application on the carrier has a contact angle of zero degrees to the carrier surface. Furthermore in order to provide a mirror reflecting surface it is essential that both the lacquer and the metallised surface are smooth enough to reflect regularly. Therefore it is an essential requirement of the process that the polymeric film hereafter referred to as the carrier film should be as smooth as possible. The carrier film should be selected such that the lacquer forms a coherent coating.

It is a further requirement that the peel forces of adhesion between the carrier film and the lacquer be as low as possible but that the shear forces of adhesion between the lacquer and the carrier film should be sufficiently high to prevent damage to the lacquer during processing.

In order for a lacquer to have a low peel force with respect to a given carrier film, it is a requirement that the lacquer should not interact chemically with the carrier film and that the intermolecular forces (which include dispersion forces, interaction of permanent dipoles, induction forces and hydrogen bonding) between the carrier film and the lacquer should be as low as possible. Further, the carrier film surface should be as smooth as possible in order to reduce mechanical adhesion (also this surface provides the replica surface for the lacquer in the composite structure). Further both the lacquer and the carrier film must have an elongation at break of at least 10% in the machine direction.

The lacquer acts as a protecting top coat since said layer of lacquer is a top coat layer if it is considered as a coating for the stratum of metal precipitated after having stripped the carrier film at the final stage of the process.

The lacquer should also be optically clear but can be dyed or pigmented, have good printability and excellent adhesion to the vapour deposited layer.

The lacquer composition may be utilised as a melt, solution, paste or lacquer. It may be applied by spreading with a knife, brushing, using a roller, calendering, casting, or like methods. An applied amount of from 1 to 5 grams per m$^2$ has been found especially desirable and convenient.

If required, said lacquer may be heated: (i) to remove solvent, (ii) accelerate crosslinking, (iii) bring about coalescence and, (iv) control of crystallisation. Furthermore, the carrier film must be able to withstand these processing conditions.

A function of said lacquer is to prevent scratching during subsequent processing of the metallised composite. The lacquer can be chosen to provide a low water vapour transmission rate and/or a low gas transmission rate and/or good heat sealability.

The metallised layer may be applied according to wellknown methods.

The stratum of metal may be deposited as a continuous film, or it may be deposited in the configuration of bands, stripes, or lines, which may be spaced or interconnected, in order to prepare partly metallised products which may be required for decorative or technical reasons.

Laminating may be done according to the wet laminating, dry laminating or the solventless laminating (e.g., hot melts) methods. When paper is the non-metallic substrate wet laminating techniques are advantageously employed.

An especially advantageous modification of the basic process is a procedure wherein both major surfaces of the carrier film are simultaneously coated with the lacquer, a thin coherent stratum of metal is then simultaneously vapour deposited upon each coated surface of the carrier film; each vapour deposited stratum of metal is then bonded to a separate non-metallic substrate by standard laminating techniques, whereby a bi-facial composite structure is produced; whereupon the two metallised substrates are (simultaneously) removed from the carrier film to produce two metallised substrates.

The paper used should have a smooth non-brittle surface. The selected paper is strongly dependent on the end use, e.g., for cigarette packing a strong bleached kraft is the most commonly used paper, but for butter and margarine wrappings greaseproof papers are required.

Among the useful lacquer and carrier film combinations are polyvinylidene chloride copolymers in combination with polypropylene film, and polyvinylidene chloride copolymers in combination with polyvinylidene fluoride film. The latter combination is particularly desirable if low water vapour transmission rate and low oxygen gas transmission rate are desirable in the finished composite since the carrier film can be heated to temperatures up to 150° C. to ensure optimum crystallisation of the lacquer and hence low oxygen transmission and water vapour transmission properties being attained.

Another useful combination is an acrylic copolymer with a polyester film or polypropylene film as the carrier film. This combination is particularly desirable if low water vapour transmission rate and heat seal resistance are required.

Figure 1:
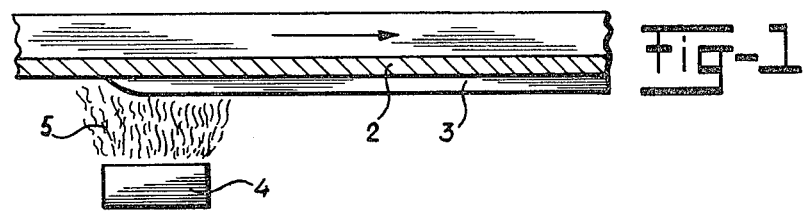
FIG. 1 is a first phase of the process in which a lacquer coated polymeric film has a coherent metallic stratum precipitated upon coating by vapor deposition technique.

With particular reference to the drawing, there is schematically shown in FIG. 1, a first essential phase of the process according to the present invention. A carrier film (1) having a preferred thickness of less than 100 microns is provided with a coating of the lacquer (2).

Figure 3:
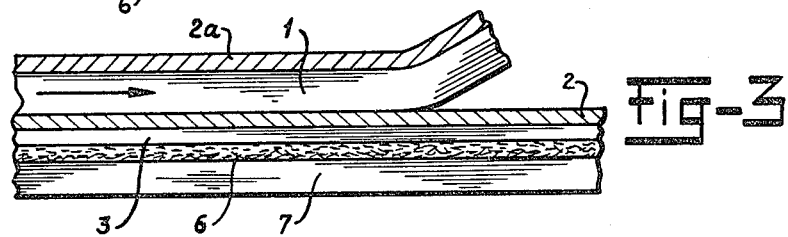
FIG. 3 is a third phase of the process in which the polymeric film is stripped from the composite structure.

In addition, to the basic lacquer components may be added one or more secondary additives selected from the group consisting of standard colouring agents, standard matting agents, standard printing agents, standard slipping agents, and standard ultraviolet light absorbing agents. The desirability of such an admixture is appreciated by those of skill in the art when it is understood that the lacquer coating (2) will become the outermost layer of the final laminar product produced as is seen in FIG. 3. Accordingly, novel and beneficial colour, matting, slipping, and absorbing properties are afforded, depending upon the nature of the secondary additive(s) employed.

The thickness of the carrier film (1) is not critical: however, it is advantageous if a film having a thickness of between about 12 microns and 30 microns is employed. It is particularly noteworthy that under the broad range of conditions specified above, film (1) may be used over and over again in the subject process, without the necessity for replacement or cleaning thereof, and without adverse effect upon any of the steps in this process. This presents an outstanding and unobvious advantage.

For the metallising process, film (1) to which the lacquer coating (2) has been applied, is caused to travel in the direction shown by the arrow in FIG. 1, in order that a coherent metallic stratum (3) may be precipitated upon coating (2) by standard vapor deposition techniques. For example, as schematically depicted in FIG. 1, metallic vapors (5) emanating from a molten metal in crucible (4) in a high vacuum chamber form a metallic stratum (3) upon the lacquer coating (2) as carrier film (1) is caused to remain in the chamber or to travel therein. Vacuums of $10^{-3}$ torr and less are commonly employed in such high vacuum chambers. As is understood by those of skill in this art, the metallic vapor may be generated by the depicted thermal evaporation technique, if desired. As is understood from FIG. 1, direct heat applied to a metal contained in crucible (4)—which is commonly constructed from boron nitride—will cause metallic vapors (5) to be generated and to impinge and are made to condense upon the exposed surface of lacquer (2). Metals having utility in the process are aluminium, gold, silver, magnesium, zinc, titanium and nickel, among many others. For purposes of economy of operation, frugality in the utilization of energy, and outstanding product properties, the thickness of the metallic stratum (3) should be between about 0.01 and 0.1 microns. Aluminium is preferred as the metal to be employed because of its relatively low cost and the outstanding properties of the very thin strata deposited therefrom.

Ordinarily the metallic stratum will be deposited in a continuous coherent film or integral layer coextensive with the surface of the lacquer coating upon the carrier film. However, it has been found advantageous to deposit the metal in one or more bands, stripes, or lines for certain applications—e.g., for decorative purposes, wherein a particular partly metallised ornamental design is effected; or for technical reasons, e.g., in order to prepare products for electronic components. Depending upon the specific purpose, the bands, stripes, or lines may be isolated from each other or connected in a chosen pattern. Such a deposition in the configuration of a band, stripe, or line may be accomplished by means of standard machine techniques, as are well known and commonly employed in the art.

Figure 2:
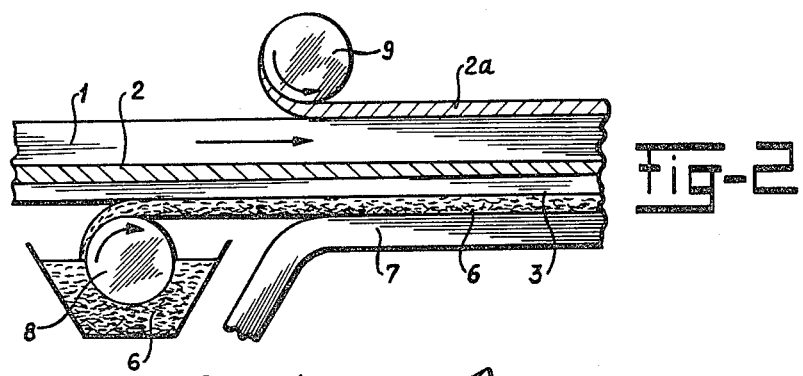
FIG. 2 is a second phase of the process in which a non-metallic substrate is bonded to the metallic stratum.

With particular reference to FIG. 2, there is shown a second essential phase of the process according to the present invention. After being removed from the high vacuum metallising chamber, film (1), having a lacquer coating (2) and metallic stratum (3) applied thereto, is caused to travel in the direction shown by the arrow, whereupon it is contacted with a standard laminating adhesive (6). Following the contact, a non-metallic substrate (7) is applied to the laminating adhesive (6) and thereby bonded to the metallic stratum (3) by means of standard laminating techniques. The following composite structure is produced as a result: carrier film (1)/lacquer coating (2)/vapor deposited metal stratum (3)/laminating adhesive layer (6)/non-metallic substrate (7).

As is seen in FIG. 2, special advantages may be achieved, if, simultaneously with the application of the laminating adhesive (6) to the exposed surface of the vapor deposited metal stratum (3), a second coating (2a) of a lacquer is applied—as by means of a roller (9)—to the free major surface of the carrier film (1). Thereby such surface will be ready for the start of a subsequent metallising procedure according to this invention, after this process is completed by the technique shown in FIG. 3. Referring again to FIG. 2, it is seen that the laminating adhesive (6) may be applied to metal (3) by standard means, as by a roller (8) partially submerged in a vessel containing the adhesive (6). Of course, other means such as spreading with a knife, brushing, coating, spraying, etc., may be employed. The thickness of the layer of laminating adhesive (6) is not critical, and will vary with the nature of the adhesive employed. The thickness of adhesive must be sufficient to afford a bond of the stratum of metal (3) to the non-metallic substrate (7). When the latter is a film or sheet fabricated from a fibrous pulp (e.g., cardboard or especially paper), a standard wet laminating adhesive is advantageously employed and standard wet laminating techniques are conveniently utilized. As an example, a cold water soluble swelling potato starch denominated KOLLOSAC 514 J has been employed with success as have other vegetable and animal glues, as well as synthetics such as carboxylated butadiene—styrene. Of course, standard dry laminating techniques can be used, if desired. Under such conditions, a particularly useful adhesive has been found to be the alcohol—dilutable two component adhesive denominated ADCOTE 340, which is available commercially.

As the non-metallic substrate (7), the following have been employed with particular beneficial results: (a) films or sheets of a fibrous material fabricated from a fibrous pulp, such as cardboard, paperboard, and paper; (b) films or sheets of a fibrous material such as nonwoven fabrics, spun-bonded fabrics, and the like. (Equally beneficial results are achieved with bonded fiber fleeces and the traditional woven and knitted textile fabrics having a "closed" surface); (c) films or sheets of commonly employed plastic materials such as polyesters, polyamides, polyvinyl chloride, and cellophane.

A third essential phase of the basic process according to the present invention is depicted in FIG. 3, wherein it is seen that upon completion of the procedural steps necessary to form the composite structure of layers (1)/(2)/(3)/(6)/(7)(and (2a), if desired), polymeric film (1) including layer (2a), if desired) is stripped or simply pulled mechanically from the composite structure to produce the desired laminar product. Moreover, as has already been pointed out, film (1) may be used over and over many times, without cleaning thereof or any adverse effect upon any procedural step, especially without any adverse effect upon the quality of the metallic stratum (3).

A major advantage of the present process over any other known metallising technique is that mirror reflective surfaces can be obtained on any grade of coated or uncoated paper or board.

The mirror reflectivity of the sample surface is measured by adhering a 150 mm×200 mm sample to a smooth flat glass surface. At an angle of 60° to the sample is placed a 150 mm×250 mm grid on which are marked 10 mm squares and numerals 1–25 in the vertical direction. The sample surface is illuminated by standard photographic lamps. A 5"×4" Micro Precision Products Technical Camera with a Schneider Xenar 1:4.5/150 lens and aperture F16 is situated 500 mm from the point of contact of grid and sample at an angle of 30° to sample. The focus is on the reflected numeral 1 from the grid and a photograph is taken. The mirror reflectivity of the sample surface is determined by examination of the photograph to see the highest number at which a clear reflected image is obtained. This number gives the mirror reflectivity rating of the sample surface.

Typical values for commercially available vacuum metallised papers, examples of which are enclosed in the Krones Manual of Labelling Technology, were for Vacumetal BEN 80 Rating 2 and for Illoalu Rating 1. The process described in this patent application gives mirror reflectivity ratings typically in excess of 4.

A further improvement may be achieved if at splitting of laminate and carrier, said carrier is kept moving straight on and said laminate is stripped from said carrier in a direction perpendicular to the machine direction of said carrier.

Figure 4:
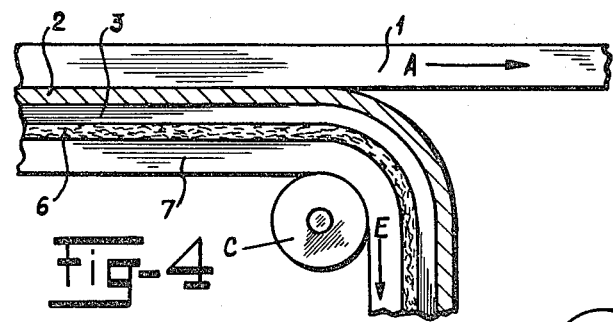
FIGS. 4 and 5 show the correct and respectively incorrect way of splitting laminate and carrier.
Figure 5:
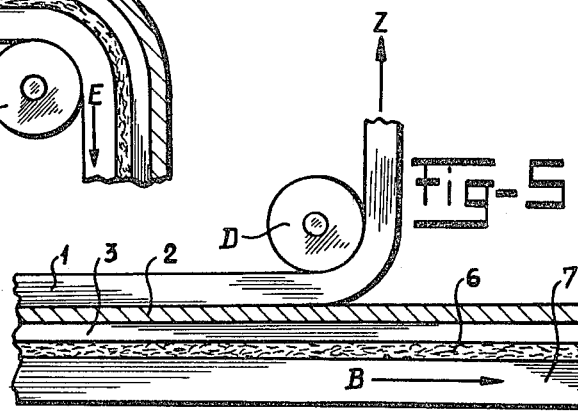

In FIGS. 4 and 5, the correct and respectively, incorrect way of splitting is shown. In FIG. 4 the carrier (1) is moved in the direction of the arrow A and at C the laminate is stripped from carrier (1) by pulling the laminate in the direction of arrow E. C is a pin that is used as a support when pulling the laminate from the carrier.

In FIG. 5, the laminate is moved in the direction of arrow B and at pin D, the carrier is stripped from said laminate by pulling the carrier (1) in the direction of arrow Z.

EXAMPLE 1

To a polyester film Melinex (ex. ICI) of thickness 19 microns was applied a lacquer comprising 67 parts of Neocryl B811 (which is an acrylic copolymer Polyvinyl Chemie) and 33 parts of Wacker Vinnol H40/55 (which contains a high level of polyvinyl acetate with polyvinyl chloride). It was applied using a solvent coating technique at a dry coating weight of 1.7 grams per square meter (gsm).

A coherent continuous stratum of aluminium metal was then vapour deposited by standard methods upon this lacquer. The thickness of aluminium layer being 0.05 microns.

A layer of laminating adhesive EPS 71 (ex. Herberts, which is a solvent based 2 component polyurethane adhesive) was applied at a dry coating weight of 2.5 gsm to bond the deposited metal layer to a bleached kraft substrate.

After the laminating adhesive had cured, the polyester film was stripped from the composite structure as disclosed in FIG. 3.

The resultant product had a reflectivity of 86%, a heat emission of 8.5% of the Stefan Boltzmann constant at 23° C., a mirror reflectivity of 5 and had a moisture vapour transmission rate (MVTR) of 1.5 g/m²/24 h at 23° C. and 60% RH.

EXAMPLE 2

To a polyvinylidene fluoride film of thickness 40 microns was applied a lacquer comprising Saran F310 (ex. Dow Chemical Co.) which is a copolymer of vinylidene chloride and acrylonitrile. It was applied using a solvent coating technique at a coating weight of 2.4 gsm using a drying temperature of 100° C.

A coherent continuous stratum of aluminium was then vapour deposited by standard methods upon this lacquer layer.

A layer of laminating adhesive which is an aqueous based styrene butadiene copolymer was applied at a dry coating weight of 10 gsm to bond the deposited metal layer to a bleached kraft substrate.

The resultant product had a reflectivity of 86%, a heat emission of 8.1% of the Stefan Boltzmann constant at 23° C., and a mirror reflectivity rating of 5.

EXAMPLE 3

To a polypropylene film of thickness 30 microns was applied a lacquer comprising 80 parts Saran F310 and 20 parts Bakelite Vinyl Solution Resin VMCH. It was applied using a solvent coating technique at a coating weight of 2.4 gsm using a drying temperature of 70° C.

A coherent continuous stratum of aluminium metal was then vapour deposited by standard methods upon this lacquer. The thickness of the aluminium layer was 0.05 microns.

A layer of laminating adhesive Adcote 340, ex. Morton Chemical Co., was applied to the lacquer at a dry coating weight of 2.5 gsm in order to bond the lacquer to a bleached kraft substrate.

After 7 days, the polypropylene film was stripped from the composite structure in the manner described in the text to produce the laminar product.

The resultant product had a reflectivity of 87%, a heat emission of 8.2% of the Stefan Boltzmann constant at 23° C., and a mirror reflectivity rating of 6.

The moisture vapour transmission rate MVTR of the composite was 1 g/m² per 24 hrs at 23° C. and 60%.

We claim:

1. A metallised vapour coated composite structure comprising a non-metallic substrate, a laminating adhesive layer on one face of said substrate, a vapor deposited metal stratum on said adhesive layer, and a lacquer coating on said stratum, said composite structure having a reflectivity of at least 85%, a heat emission of about 8% of the Stefan-Boltzmann constant at 23° C., a mirror reflectivity of at least 4 and dead fold properties that are the same as those of the substrate, said lacquer coating being obtained from a carrier film wherein liquid lacquer has a contact angle of zero degrees after application to the carrier surface.

2. The metallized vapor coat composite structure according to claim 1, further having a polymeric film on said coating.

3. A metallized vapor coated composite structure comprising a polymeric film, a lacquer coating on at least one major face of said polymeric film, wherein liquid lacquer applied has a contact angle of zero degrees after application to the face of the polymeric film a vapor deposited metal stratum on said lacquer coating on said major face, and a laminating adhesive layer on said vapor deposited metal stratum, said composite structure after application to a non-metallic substrate and stripping said polymeric film having a reflectivity of at least 85%, a heat emission of about 8% of a Stefan Boltzmann constant at 23° C., a mirror reflectivity of at least 4 and dead fold properties that are the same as those of the substrate.

4. A metallized vapor coated composite structure according to claim 3 having said lacquer coating on both major faces of said film.

5. A method of producing a metallised surface on a non-metallic substrate, wherein
   (a) a major surface of a smooth polymeric film is coated with a lacquer which will give a weak releasable bond with the surface of the polymeric film and a strong (non-releasable) bond with the surface of a stratum of metal which has been freshly vapor deposited
   (b) a thin coherent stratum of metal is precipitated upon the coated surface of the lacquer film by vapor deposition
   (c) a layer of standard laminating adhesive is applied to the exposed stratum of metal and said stratum of metal is bonded to a non-metallic substrate by standard laminating techniques whereby the following composite structure is prepared: polymeric film/lacquer coating/vapor deposited metal stratum/laminating adhesive layer/non metallic substrate and
   (d) the polymeric film is stripped from said composite structure characterised in that the liquid lacquer applied has a contact angle of zero degrees after application to the carrier surface.

6. A method of producing a metallised surface on a non-metallic substrate, according to claim 5 characterized in using a polyvinylidene chloride copolymer based lacquer as said lacquer which will give a weak bond with the surface of the polymeric film and a strong bond with a surface of the stratum of metal and a polyvinylidene fluoride film as said non-metallic substrate.

7. A method according to claim 5 in which the vapor deposited metallic layer is deposited to a thickness not exceeding 0.1 microns.

8. A method according to claim 5, characterised in stripping said carrier from said laminate by moving said carrier in a straight line and stripping said laminate from said carrier in a direction perpendicular to the machine direction of said carrier.

9. A method according to claim 5, characterised in using a lacquer and a carrier film as well, that have an elongation at break of at least 10% in the machine direction.

10. A method according to claim 5 in which said polymeric film has a thickness of about 12-30 microns, said lacquer is applied in an amount from 1-5 g/m², and said metal stratum is aluminum having a thickness of about 0.001 to 0.1 micron.

* * * * *